(12) United States Patent
Bassi

(10) Patent No.: US 6,981,864 B2
(45) Date of Patent: Jan. 3, 2006

(54) DEVICE FOR RELEASING AND REMOVING FLEXIBLE SYNTHETIC MATERIAL ELEMENTS FROM A MOLDING SURFACE

(75) Inventor: Giovanni Bassi, Faenza (IT)

(73) Assignee: Sacmi Cooperativa Meccanici Imola S.C.R.L., Imola (IT)

( * ) Notice: Subject to any disclaimer, the term of this patent is extended or adjusted under 35 U.S.C. 154(b) by 173 days.

(21) Appl. No.: 10/235,747

(22) Filed: Sep. 6, 2002

(65) Prior Publication Data

US 2003/0054066 A1    Mar. 20, 2003

(30) Foreign Application Priority Data

Sep. 14, 2001  (IT)  .......................... BO2001A0556

(51) Int. Cl.
*B29C 45/43* (2006.01)

(52) U.S. Cl. ...................... 425/556; 249/66.1; 425/437

(58) Field of Classification Search ................ 425/351, 425/437, 556, 129.1; 264/335; 249/66.1, 249/141

See application file for complete search history.

(56) References Cited

U.S. PATENT DOCUMENTS

| | | | |
|---|---|---|---|
| 5,626,887 A * | 5/1997 | Chou et al. ............... | 425/129.1 |
| 5,728,333 A | 3/1998 | Tabata et al. .............. | 264/46.4 |
| 5,935,511 A * | 8/1999 | Brown ........................ | 264/551 |
| 6,367,765 B1 * | 4/2002 | Wieder ........................ | 249/141 |
| 6,440,348 B1 | 8/2002 | Oppelt et al. ............... | 264/279 |

FOREIGN PATENT DOCUMENTS

EP     0 807 511     11/1997

\* cited by examiner

*Primary Examiner*—Duane Smith
*Assistant Examiner*—Emmanuel S. Luk
(74) *Attorney, Agent, or Firm*—Albert Josif; Daniel O'Byrne

(57) ABSTRACT

A device for releasing and removing flexible synthetic material elements from a molding surface, comprising a molding surface on which the elements are arranged, a unit for gripping the elements that can be actuated from a lower position, in which it is in contact with the element, to an upper position, the grip unit comprising a tubular body that has a vertical axis and, in a downward region, an edge for compressing, in the lower position, the peripheral region of the element onto the molding surface, forming thereat a region that forms a seal with the surface, the molding surface being provided with a blower for conveying a stream of air under the element in order to release it from the molding surface.

4 Claims, 2 Drawing Sheets

DEVICE FOR RELEASING AND REMOVING FLEXIBLE SYNTHETIC MATERIAL ELEMENTS FROM A MOLDING SURFACE

BACKGROUND OF THE INVENTION

The present invention relates to a device for releasing and removing elements made of flexible synthetic material from a molding surface.

In processes for molding elements made of flexible synthetic material, such as liners or membranes, it is necessary to release and remove, after molding, said elements from the surface on which they are arranged. After the process, said element in fact adheres to the molding surface as a consequence of the compression to which a male plug has subjected it.

According to EP-0207385, devices for releasing elements made of flexible synthetic material from a molding surface are known which comprise suction means that can be applied to said elements and act so as to separate them from said surface.

Devices are also known which are characterized by a blade that is suitable to wedge itself between the element and the surface and remove said element.

SUMMARY OF THE INVENTION

The technical aim of the present invention is to provide a device for releasing and removing elements made of flexible synthetic material from a molding surface that is capable of performing effective and rapid removal of the element from the surface on which it has been shaped.

Within the scope of this technical aim, an object of the present invention is to provide a device that can be operated easily and is versatile in use for various kinds of elements made of synthetic material.

Another object of the present invention is to achieve said aim with a structure that is simple, relatively easy to provide in practice, safe in use, effective in operation and relatively low in cost.

This aim and these objects are achieved by the present device for releasing and removing flexible synthetic material elements from a molding surface, comprising a molding surface on which said elements are arranged, a unit for gripping said elements that can be actuated from a lower position, in which it is in contact with said element, to an upper position, characterized in that said grip unit comprises a tubular body that has a vertical axis and is provided, in a downward region, with an edge that is suitable to compress, in said lower position, the peripheral region of said element onto said molding surface, forming thereat a region that forms a seal with said surface, said molding surface being provided with blower means that are suitable to convey a stream of air under said element in order to release it from said molding surface.

BRIEF DESCRIPTION OF THE DRAWINGS

Further particularities will become better apparent from the detailed description of a preferred but not exclusive embodiment of a device for releasing and removing elements made of flexible synthetic material according to the invention, illustrated by way of non-limitative example in the accompanying drawings, wherein.

DESCRIPTION OF THE PREFERRED EMBODIMENTS

Figure 1:
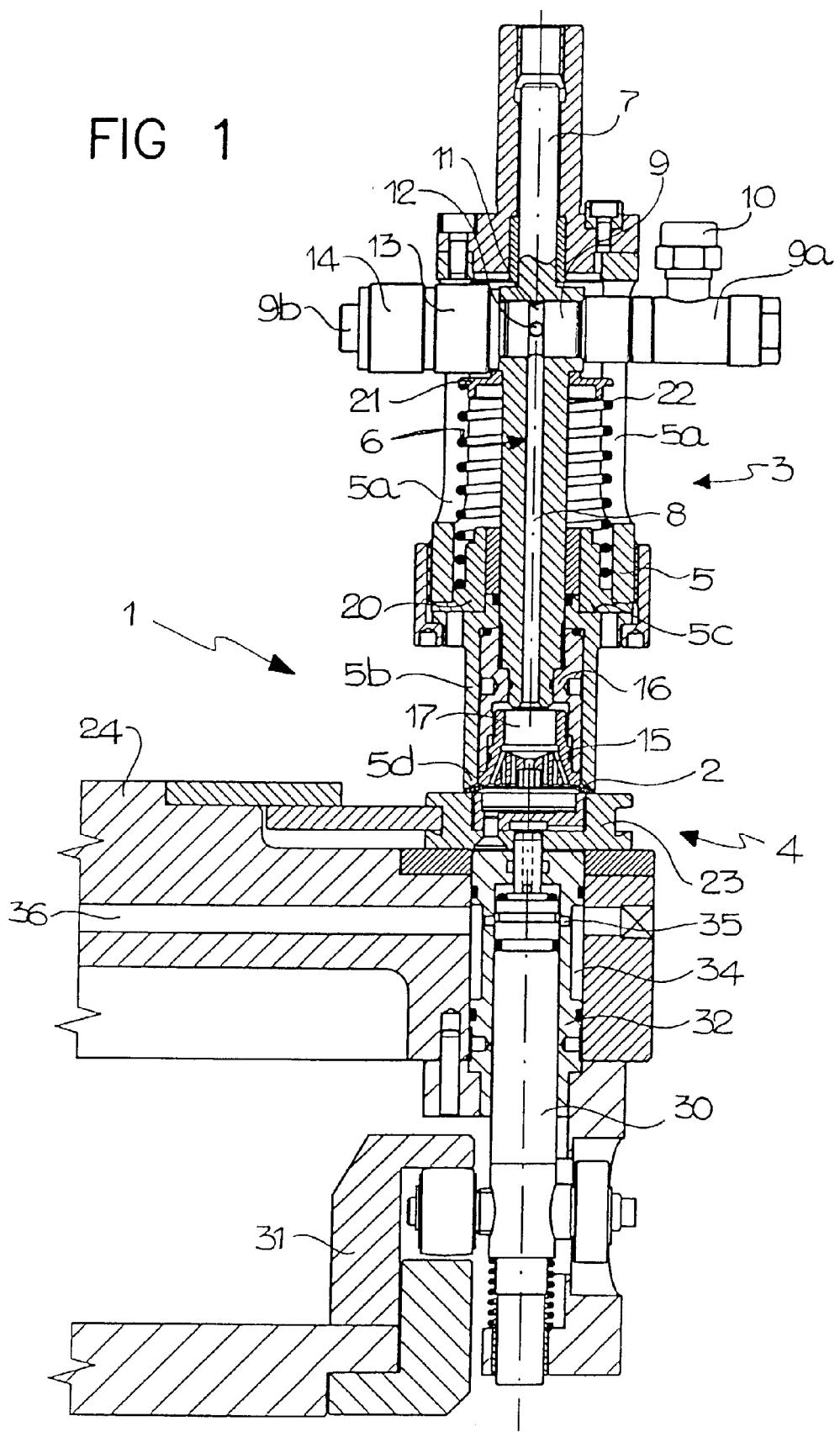
FIG. 1 is a lateral sectional elevation view, taken along a longitudinal plane, of the device.
Figure 2:
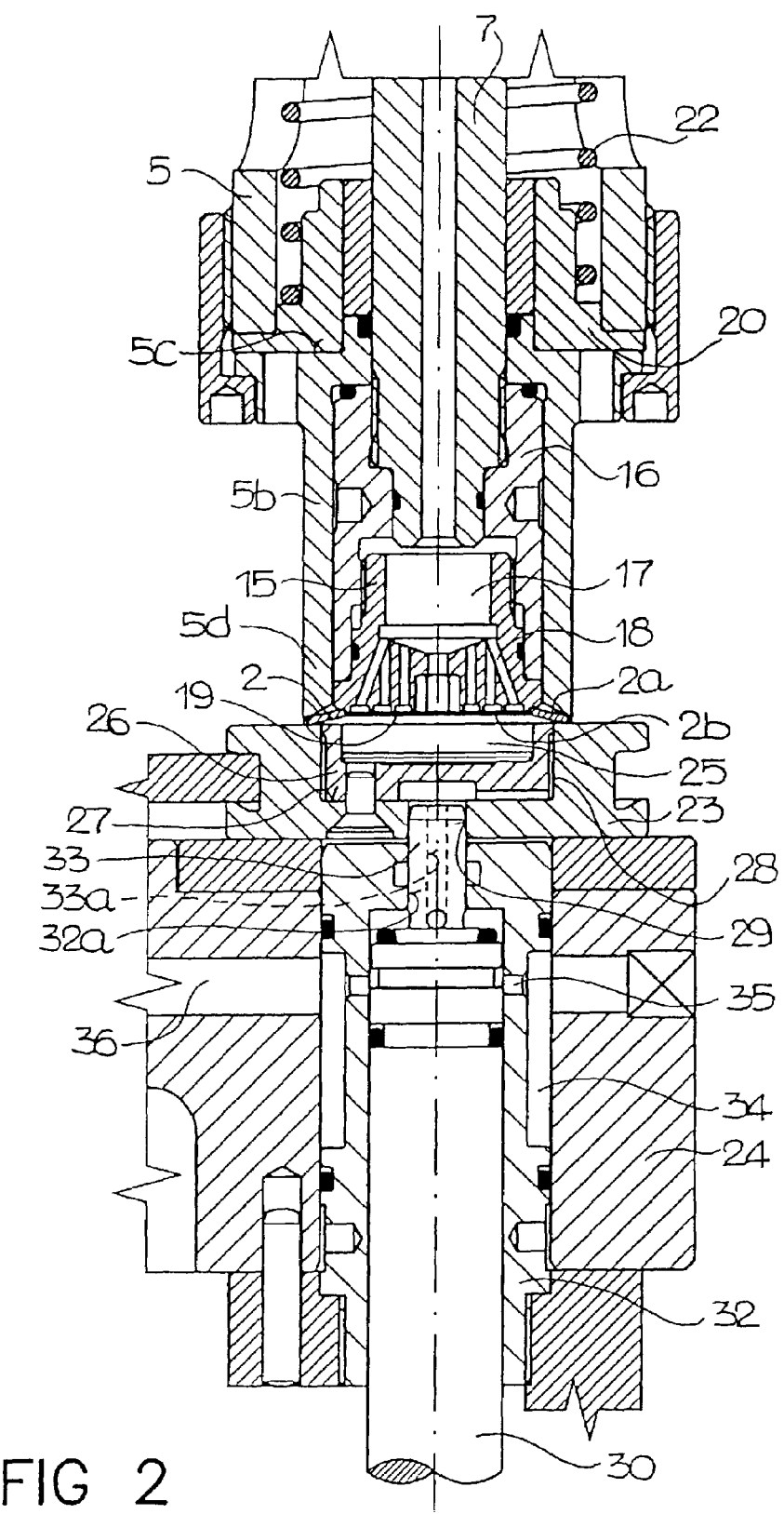
FIG. 2 is a view of a detail of FIG. 1.

With reference to the figures, the reference numeral 1 generally designates a device for releasing and removing elements made of flexible synthetic material 2 from a molding surface; the element 2 can be considered as having a peripheral region 2a and an internal region 2b. The device comprises a unit 3 for gripping the element 2, which lies on a molding surface 4 after being shaped. The grip unit 3 comprises a cylindrical tubular body 5, which has a vertical axis and can be actuated for example by virtue of a cam mechanism from a lower position, in which it is in contact with said element, to an upper position, in which it retains said element, in order to subsequently transfer it for example to other stations. The tubular body has two mutually facing longitudinal slots 5a and is provided in a downward region with a portion 5b that has a smaller diameter, forms an internal resting surface 5b, and is provided with an edge 5d, a frustum-shaped inner lateral surface and a perimeter that is equal to the perimeter of the element 2. Inside the tubular body 5 there are suction means that are suitable to remove the element 2 from the molding surface 4. Said suction means comprise a slider 6, which slidingly engages within the tubular body 5 and can be actuated from a position in which it is retracted within said body to remove the element to a position in which it protrudes downward from said body for its subsequent deposition. The slider 6 is composed of a stem 7 that is crossed axially by a suction channel 8 and of a transverse pivot 9 that is arranged at right angles to said stem and can move within the pair of longitudinal slots 5a, forming accordingly a substantially cross-shaped structure. The pivot 9 is internally hollow and is rigidly coupled, at a first end 9a, to a pneumatic connector 10 that is connected to a suction source not shown in the drawings. In the region where it crosses the suction channel 8, the pivot 8 has an annular groove 11 on which a through opening 12 connects the cavity of the pivot to said suction channel. At the second end 9b, the pivot rotatably supports an internal roller 13, which is suitable to engage within the respective longitudinal slot 5a, and an external roller 14, which s coaxial and laterally adjacent thereto and can be coupled to a cam, not shown in the drawings, which actuates the slider from the retracted position to the protruding position.

The stem 7 is connected, in a downward region, to a suction head 15 by means of a connecting sleeve 16. The head is substantially cylindrical and is coaxial to the stem, and has, in an upward region, a chamber 17, which is connected to the suction channel 8 and from which multiple ducts 18 branch out; said ducts are arranged radially and lead to the suction surface 19. The tubular body 5 internally accommodates a lower flange 20, which is locked on the supporting surface 5c, and an upper flange 21, which is keyed on the stem 7 below the transverse pivot 9. A spring 22 is engaged between said flanges, is coaxial to the stem, and acts so as to contrast the downward sliding of the slider 6 induced by the cam.

The molding surface 4 is constituted by a disk-like movable supporting plate 23 carried by a turntable 24. The plate 23 is provided, in an upward region, with retention means for the element 2 that are suitable to prevent movements thereof caused by centrifugal action by adhesion between the surfaces in contact. Said retention means are constituted by a pad 25 that is contained in a receptacle 26 located in a cylindrical seat 27 formed in said plate. An annular gap 28 is provided between the receptacle and the cylindrical seat and is connected to a hole 29 formed in the lower face of the plate 23. Means for locking the plate are comprised within the turntable 24 and are constituted by a rod 30 that is actuated, by virtue of cam means 31, so as to slide within a bush 32 that is rigidly coupled to the turntable and is provided with an upper hole 32a. The rod 30 has, in an upward region, a tang is 33 that is provided with an axial cavity 33a that is connected to the lateral surface of said tang; the tang can be inserted in the hole 29 of the plate 23 through the upper hole 32a and constitutes a restraint against centrifugal movements of said base.

The molding surface 4 further comprises blowing means for conveying a stream of air under the element 2, facilitating its separation. Said blowing means comprise an annular recess 34, which is provided in the central portion of the bush 32 and has multiple through openings 35 that are arranged radially. The annular recess is connected to an interspace 36 that is provided on the turntable 24 and is connected to a source of compressed air that is not shown in the drawings.

The operation of the device according to the invention is as follows. The supporting plate 23 provided with the element 2, rigidly coupled to the turntable 24 by virtue of the engagement of the tang 33 in the hole 29, is guided, due to the rotation of said turntable, under the grip unit 3, in a position that is coaxial thereto. The slider 6 is initially in a retracted position inside the tubular element 5. The grip unit is lowered, in a downward position, onto the plate 23, until the edge 5d compresses the peripheral region 2a of the element 2, thus forming a hermetic region between said element and the plate 23. Then the corresponding source produces a stream of air that follows the path formed in succession by the interspace 36, the recess 34, the openings 35, the cavity 33a and the gap 28. The air thus conveyed reaches the lower surface of the element 2, inducing the lifting of the corresponding internal region 2b toward the suction surface 19, forming a cambered region. Then a negative pressure is generated inside the suction channel 8 and the internal region 2b adheres to the suction surface 19 by virtue of the presence of the ducts 18 on the head 15. At this point the grip unit 3, to which the element 2 adheres, can rise to an upper position and deposit said element as a consequence of the end of the negative pressure inside the suction channel 8 and of the lowering of the slider 6 into a protruding position by virtue of the action of the cam.

It has thus been shown that the invention achieves the intended aim and objects. In particular, the device allows to remove effectively the element made of synthetic material from the molding surface and is easy and versatile to use. Advantageously, the invention allows to release elements made of flexible synthetic material that have complicated cross-sections, for example with concentric ribs.

The invention thus conceived is susceptible of numerous modifications and variations, all of which are within the scope of the appended claims. In particular, the edge 5d can be such as to follow the camber of the element when it separates from the molding surface.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. BO2001A000556 from which this application claims priority are incorporated herein by reference.

What is claimed is:

1. A device for releasing and removing flexible synthetic material elements from a molding surface, comprising: a molding surface on which the flexible elements are arranged; a gripping unit for gripping said flexible elements, which is actuatable from a lower position, in which the unit is in contact with said flexible element, to an upper position, wherein said gripping unit comprises a tubular body that has a vertical axis and is provided, in a downward region, with an edge adapted to compress, in said lower position, a peripheral region of said element onto said molding surface, forming thereat a region that provides a seal with said surface; and blower means provided at said molding surface for conveying a stream of air under said flexible element in order to release the flexible element from said molding surface, said tubular body of said gripping unit further comprising internal suction means for actuating adhesion of the internal region of said element to said gripping unit in order to removing the flexible element from said molding surface, said suction means comprising a slider which has a suction channel and is slidingly engaged within said tubular body, said slider being actuatable from a position in which the slider is retracted within said tubular body to remove said element, to a position in which the slider protrudes downward from said tubular body for subsequent deposition of said element.

2. The device for releasing and removing flexible elements of claim 1, comprising: first and second longitudinal slots formed in said tubular body; a proximal wheel engaged in said first slot; a cam; and a distal wheel that is coupled to the cam, said cam actuating said slider from said retracted position to said protruding position, said slider comprising a stem in which said suction channel is provided and having, in a downward region thereof, a suction head having multiple crossing ducts therein connected to said channel, said stem being provided with a transverse pivot that is arranged at a right angle with respect thereto so as to be slideable within said first and second longitudinal slots formed in said tubular body, said transverse pin rotatably supporting said proximal wheel.

3. The device for releasing and removing flexible elements of claim 1, wherein said edge of said tubular body has a frustum-shaped internal surface.

4. The device for releasing and removing flexible elements of claim 1, wherein said molding surface is constituted by a movable supporting plate provided with retaining means for retaining said element, said blower means comprising a gap formed on said supporting plate for conveying said air stream under said element.

* * * * *